(12) United States Patent
Arndt et al.

(10) Patent No.: US 8,166,413 B2
(45) Date of Patent: Apr. 24, 2012

(54) MULTI-STEP PROGRESS INDICATOR AND METHOD FOR INDICATING PROGRESS IN A MULTI-STEP COMPUTER APPLICATION

(75) Inventors: Mary Ellen Arndt, Macedon, NY (US); Michael Kerrigan Hawes, Pittsford, NY (US); Anna Forte, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1079 days.

(21) Appl. No.: 12/046,111

(22) Filed: Mar. 11, 2008

(65) Prior Publication Data

US 2009/0235194 A1 Sep. 17, 2009

(51) Int. Cl.
*G06F 3/048* (2006.01)
(52) U.S. Cl. ......... 715/772; 715/712; 715/818; 715/855
(58) Field of Classification Search ............... 715/712, 715/772, 818, 855
See application file for complete search history.

(56) References Cited

U.S. PATENT DOCUMENTS

| | | | |
|---|---|---|---|
| 6,003,011 A | 12/1999 | Sarin et al. | |
| 6,456,303 B1* | 9/2002 | Walden et al. | 715/705 |
| 6,968,505 B2* | 11/2005 | Stoll et al. | 715/712 |
| 7,194,685 B2* | 3/2007 | Morrison | 715/705 |
| 2007/0027733 A1* | 2/2007 | Bolle et al. | 705/7 |
| 2009/0138801 A1* | 5/2009 | Schober | 715/712 |

* cited by examiner

*Primary Examiner* — Namitha Pillai
(74) *Attorney, Agent, or Firm* — MH2 Technology Law Group LLP

(57) ABSTRACT

A system and method for displaying and providing access to information on a display unit are provided for combining a plurality of logical progression steps into a plurality of predetermined groups. Each of the plurality of predetermined groups includes a subset of data. The system and method includes displaying the plurality of predetermined groups in a collapsed format; prompting a user to expand a first group of the plurality of predetermined groups; allowing the user to access and input data into the first group; and allowing the user to access a second group of the plurality of predetermined groups once all logical progression steps in the first group have been completed by the user.

18 Claims, 3 Drawing Sheets

MULTI-STEP PROGRESS INDICATOR AND METHOD FOR INDICATING PROGRESS IN A MULTI-STEP COMPUTER APPLICATION

TECHNICAL FIELD

The present disclosure relates to software applications, and, more specifically, to a method and system for displaying and providing access to information on a display unit by use of a progress indicator designed for wizard-like software applications.

BACKGROUND

With the influx of thousands of computer software applications, it has become difficult to quickly and efficiently learn how to use such new software. One way that software developers have enabled users to learn the software they produce is via software wizards. A wizard is a user interface element where the user is led through a sequence of dialogs. A wizard consists of multiple wizard pages that a user progresses through by clicking on the Next or Back buttons. Each wizard page of the wizard provides some information to the user to guide him or her through a subset of tasks necessary to complete a larger task. Wizards are used very commonly within graphical user interface operating systems and by hundreds of applications that run in these operating systems. With a wizard, the user is guided in performing the task in a specific sequence.

The challenge is indicating to users of software wizard applications the step they are on in a multi-step process, the steps they have already completed, and the steps that are remaining, without taking up too much valuable real estate on the user interface. Currently, one method for indicating progress in a wizard-like user interface is to simply show the user the current step in the process. However, this approach does not provide the user with enough feedback. Another approach is to list all the steps in the process, which can take up too much space and appear discouraging to the user.

Consequently, none of these methods has presented a desirable solution for indicating to a user of software the step the user is on, the steps remaining, and/or the steps completed in a lengthy process. Therefore, it would be highly desirable to provide a method and system for displaying and providing access to information on a display unit by use of a progress indicator designed for wizard-like software applications.

SUMMARY

A method is provided for displaying and providing access to information on a display unit. The method includes combining a plurality of logical progression steps into a plurality of predetermined groups. Each of the plurality of predetermined groups includes a subset of data. The method further includes displaying the plurality of predetermined groups in a collapsed format; prompting a user to expand a first group of the plurality of predetermined groups; allowing the user to access and input data into the first group; and allowing the user to access a second group of the plurality of predetermined groups once all logical progression steps in the first group have been completed by the user.

A system is also provided for displaying and providing access to information. The system includes a software application for combining a plurality of logical progression steps into a plurality of predetermined groups. Each of the plurality of predetermined groups includes a subset of data. The system further includes a display unit for displaying the plurality of predetermined groups in a collapsed format; an inputting/outputting device for: prompting a user to expand a first group of the plurality of predetermined groups; allowing the user to access and input data into the first group; and allowing the user to access a second group of the plurality of predetermined groups once all logical progression steps in the first group have been completed by the user.

A computer program product is also provided for displaying and providing access to information on a display unit. The computer program product includes a storage medium readable by a processing circuit and storing instructions for execution by the processing circuit for facilitating a method. The method includes combining a plurality of logical progression steps into a plurality of predetermined groups. Each of the plurality of predetermined groups including a subset of data. The method further includes displaying the plurality of predetermined groups in a collapsed format; prompting a user to expand a first group of the plurality of predetermined groups; allowing the user to access and input data into the first group; and allowing the user to access a second group of the plurality of predetermined groups once all logical progression steps in the first group have been completed by the user.

DETAILED DESCRIPTION

The exemplary embodiments of the present disclosure pertain to a system and method for displaying and providing access to information on a display unit by use of a progress indicator designed for wizard-like software applications.

Specifically, the exemplary embodiments of the present disclosure pertain to a progress indicator designed for software wizard applications that include several steps. The steps in the software wizard are grouped together into manageable groups that expand and collapse as the users work their way through the software wizard. The current group of steps may be indicated with shading and the current step within that group may be marked with an indicator. The completed steps may be visually indicated with a check mark. Each step in the progress bar also acts as a hyperlink to that step, so that the user can quickly return to a step without many clicks of the back button. These features will become better understood with regard to the following description of the exemplary embodiments.

Figure 1:
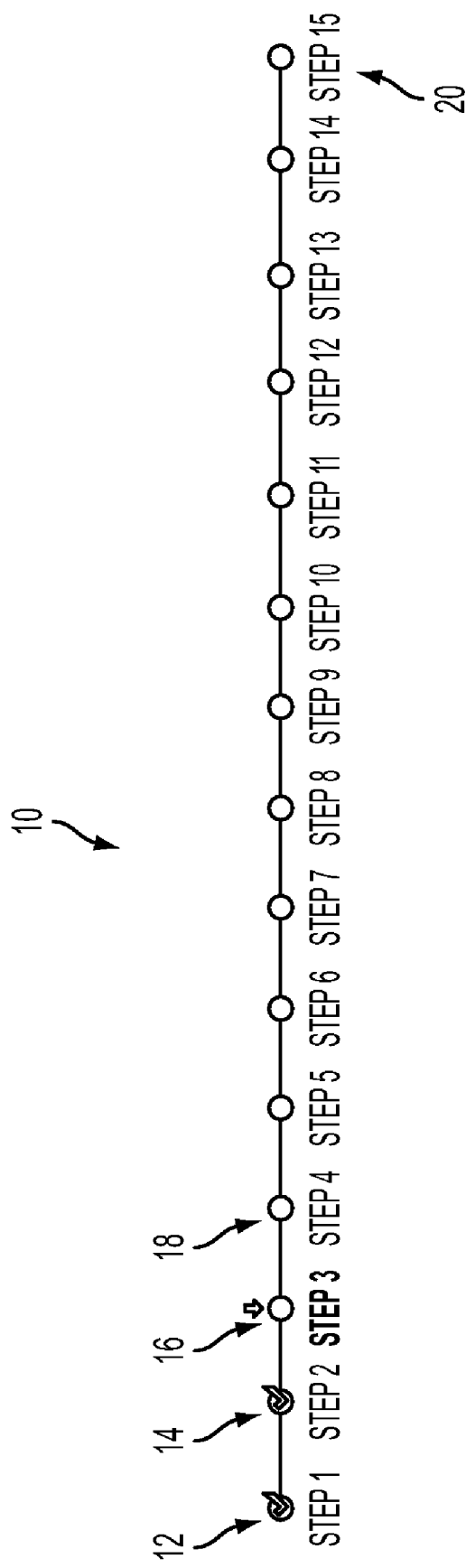
FIG. 1 illustrates a conventional linear progress indicator.

FIG. 1 illustrates a conventional linear progress indicator of a 15-step process. The process 10 includes a first step 12, a second step 14, a third step 16, a fourth step 18, and a fifteenth step 20.

In FIG. 1, the first step 12 has been completed, the second step 14 has been completed, and the process 10 is currently located at the third step 16. The process 10 awaits the user to complete the third step 16 in order to move onto the fourth step 18. However, the user is not aware of the fact that he or she is currently on the third step 16 of the process 10. The user is also not aware that the fifteenth step 20 is the last step of the process 10. None of this information is available to a user utilizing a conventional software wizard program.

As a result, in this conventional approach, a user is led through a lengthy sequence of steps in which the user is unfamiliar with the number of steps completed and the number of steps remaining. This approach not only takes up too much screen real estate, but the task at hand may seem daunting to the user. Consequently, not providing enough feedback to the user produces a user that may be discouraged in finishing all the steps in the process 10 and attempt to use the software by a trial-and-error basis, instead of using the software wizard developed by the software engineers.

Figure 2:
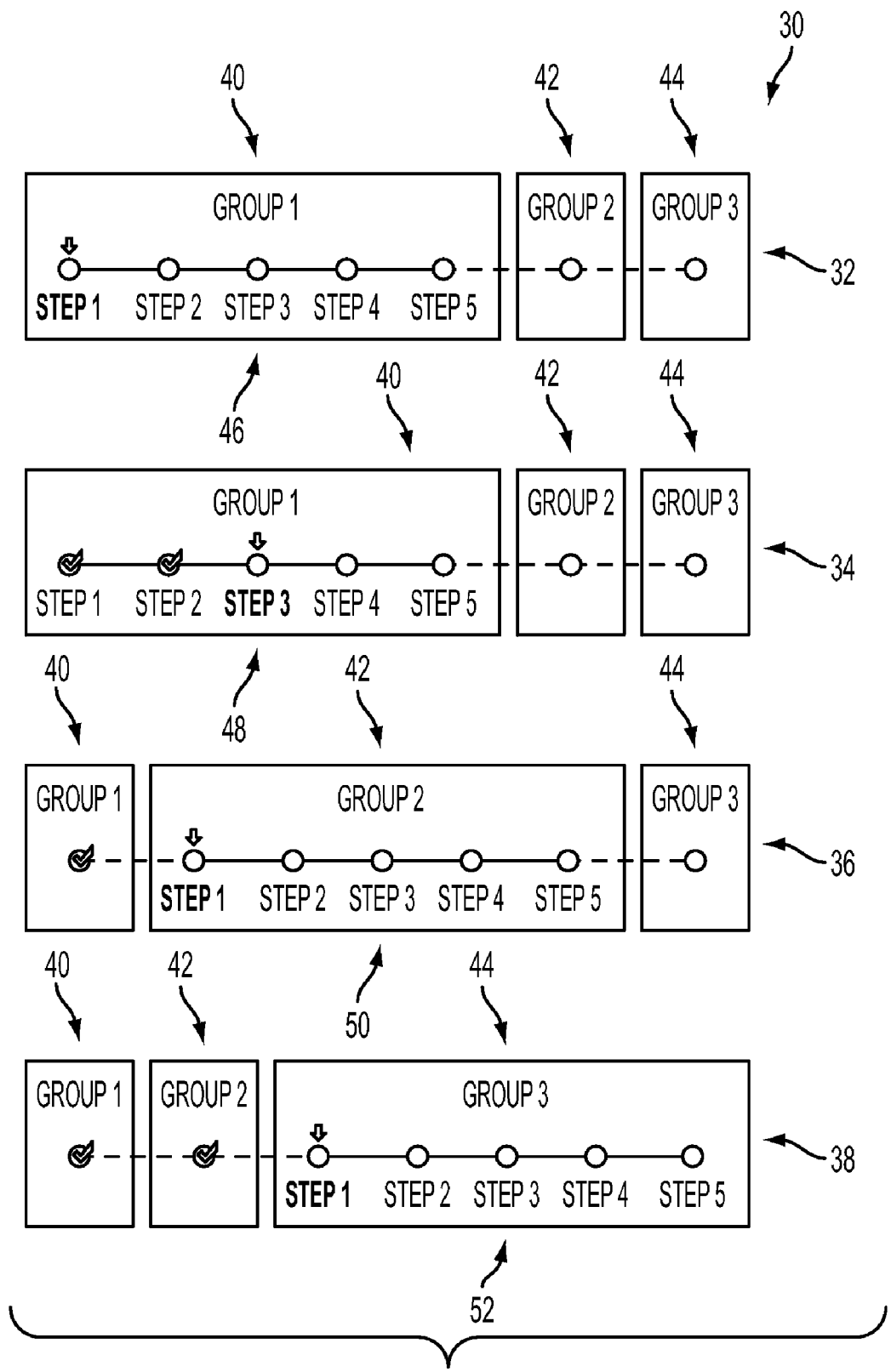
FIG. 2 illustrates a progress indicator including a plurality of groups each having a plurality of steps in accordance with the exemplary embodiments of the present disclosure.

FIG. 2 illustrates a progress indicator including a plurality of groups each having a plurality of steps in accordance with the exemplary embodiments of the present disclosure. The multi-step progress indicator 30 includes a first progress view 32, a second progress view 34, a third progress view 36, a fourth progress view 38, a first group 40, a second group 42, a third group 44, a set of steps for group one 46, a completed set of steps for group one 48, a set of steps for group two 50, and a set of steps for group three 52.

FIG. 2 provides an example of how the multi-step progress indicator 30 would first appear to the user. The visual indicators in the first progress view 32 provide feedback to the user that the user is currently on step 1 of group 1 and no steps have been completed. Groups 2 and 3 are currently collapsed in the first progress view 32. After the user completes the first 2 steps, the multi-step progress indicator 30 looks like the second progress view 34.

In the second progress view 34, the user is on step 3 of group 1 (as indicated by the arrow and the bold text). When step 5 is completed and the user clicks the Next button, the set of steps for group one 46 collapses and group 2 expands, so that the multi-step progress indicator 30 looks like the third progress view 36.

In the third progress view 36, the check mark in group 1 indicates all of the steps in that set have been completed (i.e., set of steps for group one 46). The user is now on the first step in group 2 (as indicated by the arrow and the bold text). After completion of the set of steps of group two 50, and upon clicking the Next button, group 2 collapses and group 3 expands. The multi-step progress indicator 30 looks like the fourth progress view 38.

In the fourth progress view 38, the first 2 groups of steps have been completed (i.e., set of steps for group one 46 and the second set of steps for group two 50) and the user is on the last group. The user can return to any of the previous steps by clicking anywhere in the shaded area to expand the group and then clicking on the specific step to return directly to that step. The user is now on the first step in group 3 (as indicated by the arrow and the bold text). After completion of the set of steps of group three 52, and upon clicking the Next button, group 3 collapses and the user is aware of the fact that the multi-step progress indicator 30 has been satisfactorily completed.

Figure 3:
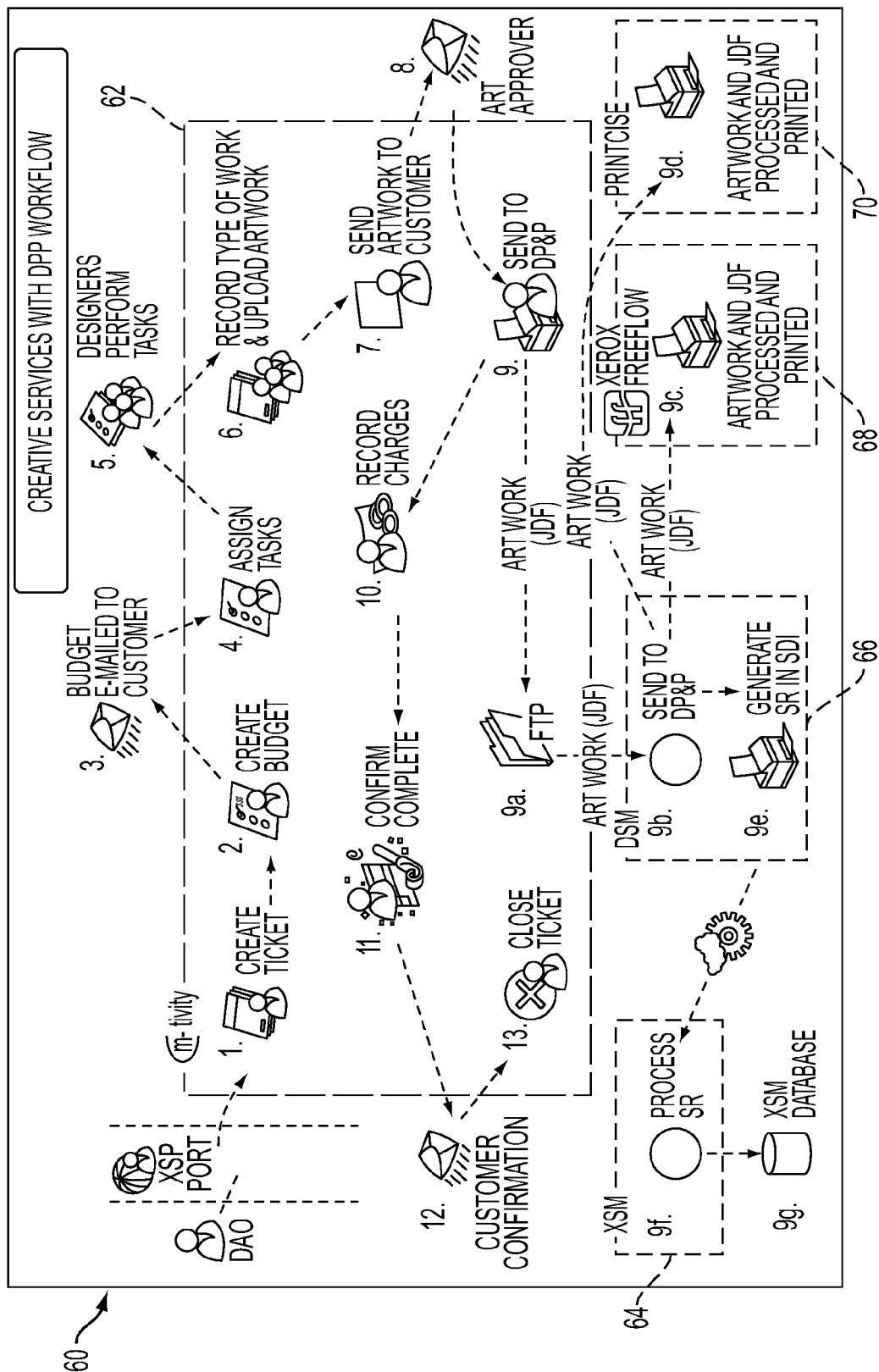
FIG. 3 illustrates a complex workflow process implementing the progress indicator software described in FIG. 2 in accordance with the exemplary embodiments of the present disclosure.

FIG. 3 illustrates a complex workflow process implementing the progress indicator software described in FIG. 2 in accordance with the exemplary embodiments of the present disclosure. The flowchart 60 includes an external applications/partners box 62, an SDI applications box 64, a first DOCS applications box 66, a PSG applications box 68, and a second DOCS applications box 70.

The external applications/partners box 62 includes a create ticket icon 1, a create budget icon 2, a budget email to customer icon 3, an assign tasks icon 4, a designers perform tasks icon 5, a record type of work icon 6, a send artwork to customer icon 7, an art approver email icon 8, a send to DP&P icon 9, an FTP icon 9a, a record charges icon 10, a confirm complete icon 11, a customer confirmation icon 12, and a close ticket icon 13.

The SDI applications box 64 includes a process SR icon 9f and a XSM database icon 9g.

The first DOCS applications box 66 includes a send to DP&P icon 9b and a generate SR in SDI icon 9e.

The PSG applications box 68 includes an artwork and JDF processed and printed icon 9c.

The second DOCS applications box 70 includes an artwork and JDF processed and printed icon 9d.

The external applications/partners box 62 can be thought of as a first group, the SDI applications box 64 can be thought of as a second group, the first DOCS applications box 66 can be thought of as a third group, the PSG applications box 68 can be thought of as a fourth group, and the second DOCS applications box 70 can be thought of as a fifth group.

Each of these five groups consists of a number of steps in a multi-step process. The first group includes 13 steps, the second group includes 2 steps, the third group includes 2 steps, the fourth group includes 1 step, and the fifth group includes 1 step. The multi-step progress indicator 30 of FIG. 2 can be used to indicate the progression of steps completed by a user.

Another example where the teachings of the present disclosure can be beneficial is completing mortgage documents. It is well known that the management of mortgage applications is a time-consuming process which requires tracking many documents through the life of the application. The exemplary embodiments described herein can aid the person responsible for the mortgage documents by giving a quick and clear indication of where the application is in the process.

The exemplary embodiments of the present disclosure could also be used to track a user's progress through a complex job ticketing system or workflow manager. Xerox® also has a complex customer qualification process in which subsequent steps are dependant on the responses to previous steps. The exemplary embodiments of the present disclosure could be used with a customer qualification form by dynamically displaying the steps remaining in one or more processes.

It will be appreciated that variations of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims. The claims can encompass embodiments in hardware, software, or combinations thereof.

In the claims:

1. A method of displaying user progress in a software program executed by one or more processors, comprising:
   grouping a plurality of steps into a plurality of groups;
   displaying the plurality of groups in a progress indicator within the software program;
   determining a current step associated with a user, wherein the current step is a step within the plurality of steps that the user has not completed and for which the user has completed all prior steps within the plurality of steps;
   displaying a current group from among the plurality of groups, wherein the current group contains the current step, and wherein displaying the current group comprises:
   displaying each step within the current group; and
   displaying an indication for each step in the current group that the user has completed;
   displaying one or more non-current groups from among the plurality of groups, wherein the one or more non-current groups consist of groups that do not contain the current step, and wherein displaying the one or more non-current groups comprises displaying the one or more non-current groups in collapsed form such that individual steps contained in the one or more non-current groups are not visible;

determining that the user has completed all steps contained in one or more completed groups from among the one or more non-current groups; and displaying an indication that the user has completed the one or more completed groups while continuing to display the one or more completed groups in collapsed form.

2. The method of claim 1, further comprising:

determining that the user has completed a last step in the current group; and in response to determining that the user has completed the last step in the current group:

collapsing the current group, wherein collapsing the current group comprises displaying the current group such that individual steps contained in the current group are not visible; and expanding a next group from among the plurality of groups, wherein the next group contains a next step following the last step, and wherein expanding the next group comprises displaying each step in the next group.

3. The method of claim 1, wherein the plurality of steps are fully ordered.

4. The method of claim 3, wherein each group from among the plurality of groups comprises a plurality of consecutively ordered steps.

5. The method of claim 4, wherein each step from among the plurality of steps falls within only a single group from among the plurality of groups.

6. The method of claim 1, wherein steps within the plurality of steps that are subsequent to the current step are determined conditionally depending on how the user performed a step prior to the current step.

7. A system configured to display user progress in a software program, the system comprising:

a processing system comprising one or more processors; and a memory system comprising one or more computer-readable media, wherein the computer-readable media contain instructions that, when executed by the processing system, cause the processing system to perform operations comprising:

grouping a plurality of steps into a plurality of groups;

displaying the plurality of groups in a progress indicator within the software program;

determining a current step associated with a user, wherein the current step is a step within the plurality of steps that the user has not completed and for which the user has completed all prior steps within the plurality of steps;

displaying a current group from among the plurality of groups, wherein the current group contains the current step, and wherein displaying the current group comprises:

displaying each step within the current group; and displaying an indication for each step in the current group that the user has completed;

displaying one or more non-current groups from among the plurality of groups, wherein the one or more non-current groups consist of groups that do not contain the current step, and wherein displaying the one or more non-current groups comprises displaying the one or more non-current groups in collapsed form such that individual steps contained in the one or more non-current groups are not visible;

determining that the user has completed all steps contained in one or more completed groups from among the one or more non-current groups; and displaying an indication that the user has completed the one or more completed groups while continuing to display the one or more completed groups in collapsed form.

8. The system of claim 7, the operations further comprising:

determining that the user has completed a last step in the current group; and in response to determining that the user has completed the last step in the current group:

collapsing the current group, wherein collapsing the current group comprises displaying the current group such that individual steps contained in the current group are not visible; and expanding a next group from among the plurality of groups, wherein the next group contains a next step following the last step, and wherein expanding the next group comprises displaying each step in the next group.

9. The system of claim 7, wherein the plurality of steps are fully ordered.

10. The system of claim 9, wherein each group from among the plurality of groups comprises a plurality of consecutively ordered steps.

11. The system of claim 10, wherein, each step from among the plurality of steps falls within one group from among the plurality of groups.

12. The system of claim 7, wherein steps within the plurality of steps that are subsequent to the current step are determined conditionally depending on how the user performed a step prior to the current step.

13. A non-transitory computer-readable medium containing instructions for causing one or more processors to perform a method comprising:

grouping a plurality of steps into a plurality of groups;

displaying the plurality of groups in a progress indicator within the software program;

determining a current step associated with a user, wherein the current step is a step within the plurality of steps that the user has not completed and for which the user has completed all prior steps within the plurality of steps;

displaying a current group from among the plurality of groups, wherein the current group contains the current step, and wherein displaying the current group comprises:

displaying each step within the current group; and displaying an indication for each step in the current group that the user has completed;

displaying one or more non-current groups from among the plurality of groups, wherein the one or more non-current groups consist of groups that do not contain the current step, and wherein displaying the one or more non-current groups comprises displaying the one or more non-current groups in collapsed form such that individual steps contained in the one or more non-current groups are not visible;

determining that the user has completed all steps contained in one or more completed groups from among the one or more non-current groups; and displaying an indication that the user has completed the one or more completed groups while continuing to display the one or more completed groups in collapsed form.

14. The computer-readable medium of claim 13, the method specified by the instructions further comprising:

determining that the user has completed a last step in the current group; and in response to determining that the user has completed the last step in the current group:

collapsing the current group, wherein collapsing the current group comprises displaying the current group such that individual steps contained in the current group are not visible; and expanding a next group from among the plurality of groups, wherein the next group contains a next step following the last step, and wherein expanding the next group comprises displaying each step in the next group.

15. The computer-readable medium of claim 13, wherein the plurality of steps are fully ordered.

16. The computer-readable medium of claim 15, wherein each group from among the plurality of groups comprises a plurality of consecutively ordered steps.

17. The computer-readable medium of claim 16, wherein each step from among the plurality of steps falls within one group from among the plurality of groups.

18. The computer-readable medium of claim 13, wherein steps within the plurality of steps that are subsequent to the current step are determined conditionally depending on how the user performed a step prior to the current step.

* * * * *